United States Patent

[11] 3,586,821

| [72] | Inventor | Robert Konrad Buob |
| | | Como, Italy |
| [21] | Appl. No. | 523,203 |
| [22] | Filed | Jan. 26, 1966 |
| [45] | Patented | June 22, 1971 |
| [73] | Assignee | W. R. Grace & Co. |
| | | Duncan, S.C. |
| [32] | Priority | Feb. 10, 1965 |
| [33] | | Germany |
| [31] | | D46481 |

[54] APPARATUS FOR PRODUCING SEALS ACCORDING TO THE MULTIPOINT METHOD
1 Claim, 5 Drawing Figs.

| [52] | U.S. Cl. | 219/243 |
| [51] | Int. Cl. | H05b 1/00 |
| [50] | Field of Search | 219/243, 529, 549, 207; 83/15, 16; 156/515 |

[56] References Cited

UNITED STATES PATENTS

| 1,323,504 | 12/1919 | Turner | 219/227 X |
| 1,625,009 | 4/1927 | Whited | 219/227 X |
| 1,850,280 | 3/1932 | Haynes | 219/227 |
| 2,711,781 | 6/1955 | Langer | 219/243 X |
| 2,732,479 | 1/1956 | Rowland | 219/529 X |
| 3,067,309 | 12/1962 | Chinn | 219/243 |
| 3,115,564 | 12/1963 | Staly | 156/515 X |
| 3,119,922 | 1/1964 | Mayhew | 219/243 X |
| 3,271,560 | 9/1966 | Schott, Jr. | 219/243 |

FOREIGN PATENTS

| 1,136,057 | 3/1957 | France | 219/243 |
| 149,175 | 4/1936 | Germany | 219/243 |
| 948,588 | 8/1956 | Germany | 219/243 |

Primary Examiner—J. V. Truhe
Assistant Examiner—C. L. Albritton
Attorneys—Charles E. Parker and John J. Toney ABSTRACT: This invention is directed to an apparatus for thermally sealing materials together in a discontinuous manner. The apparatus includes a thermally insulative member that has a sealing surface, and underside and a plurality of spaced perforations therethrough. An electrical resistance wire has a plurality of first parts passing between two adjacent perforations on the sealing surface of the insulative member and a plurality of second parts extending to the next perforation on the underside of the insulative member. The insulative member is convex shaped and held in convex position by means of springs.

APPARATUS FOR PRODUCING SEALS ACCORDING TO THE MULTIPOINT METHOD

This invention relates to multipoint heat sealing. In one aspect the invention relates to a device for producing a discontinuous heat seal.

Instead of the continuous sealing lines, packaging films are today often heat sealed by the multipoint method; that is, the method comprising fusing a plurality of thermoplastic films together by the use of a plurality of spaced heat sealed points similar to spot welding. This technique has particular usefulness with high shrink energy heat shrinkable films since a minimum amount of heat is applied to the film so that the films do not shrink or form wrinkles at the seam, are not extended or stretched and thus avoid becoming too thin in the region of the seam or seal.

A number of multipoint sealing device have been proposed. For example, comblike sealing jaws have been used for this purpose; these sealing jaws have such a great thermal capacity that irregular seals are obtained. Moreover, the heat emission of such devices causes trouble in many respects; working with high-speed aggregates is impossible.

According to another suggestion, glass rods with heating wires spirally wound thereon are used as welding or sealing instruments. Therewith diagonal dash seals are obtained which cannot take up the tension of the film normal to the stretching direction,. Moreover, with these devices uniform seals can only be obtained on straight lines but not on curved lines. When elastic packages are sealed, the rigid glass rod does not contact all points so that, e.g. in the central sector, the seal is incomplete.

It is an object of the invention to provide a device for sealing elongated heat sealable members together.

Another object is to provide a device for thermally sealing a plurality of thermoplastic films together.

Yet another object is to provide a device for forming a discontinuous heat seal.

These and other objects will be readily apparent to those skilled in the art from the following description and appended drawing and claims.

These objects are broadly accomplished by a device comprising a resistance wire "stitched" into an insulating backing member. More specifically, a multipoint sealer is provided which is characterized by a sealing bar comprising or covered with an insulating material having spaced perforations through which a heating wire is drawn in such a way that a part of the wire is between two adjacent perforations on the surface of the sealing bar and then extends to the following perforation on the underside of the sealing surface. Preferably the parts of the wire positioned on the surface of the sealing bar form a discontinuate straight, angled or open or closed curved line and may in addition form several staggered discontinuate lines. Moreover, it is frequently desirable to employ a sealing bar having a convex shape; in addition, the bar may be kept by spring pressure in this position so that it contacts every point of the sealing area when sealing flexible packages.

These multipoint sealers are useful for sealing of all thermally sealable or weldable materials, especially thermoplastic films, in particular hard polyvinyl chloride (PVC), soft PVC, polymers of monoolefins, such as polyethylene, polypropylene, polybutene and copolymers thereof, polymers of vinylidene chloride and vinyl chloride (saran) and the like. The material may be nonshrinkable or heat shrinkable; that is, an oriented film which tends to shrink back to its original dimension upon the application of heat.

The final form of the seal, whether straight-lined, rectangular, circular, oval or almost punctiform, can be adjusted without difficulties; also the distance and the length of the respective sealing wire sections can easily be changed. The device can be used for hand operation as well as for high speed machines. The exactness of the multipoint seals is excellent, and the general heat emission minor.

The invention is further illustrated by the appended drawings wherein.

Figure 1A:
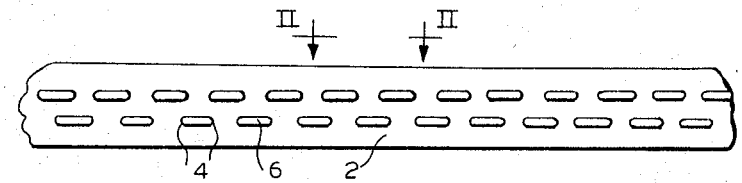
FIG. 1a is a top view on a sealing bar for producing a straight sealing line according to the invention.
Figure 1B:
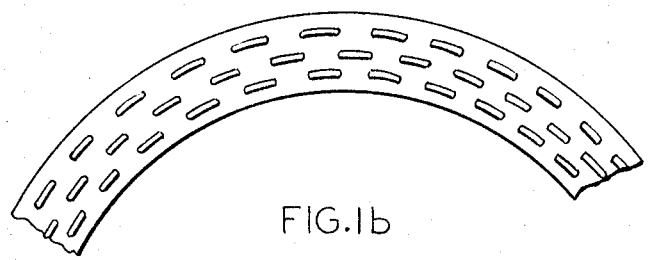
FIG. 1b is a semicircular sealing bar for producing curved sealing lines.
Figure 2:
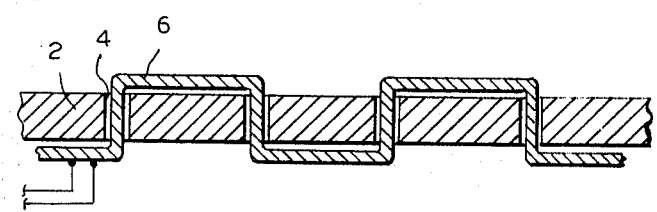
FIG. 2 is a longitudinal section of the sealing bar of FIG. 1a in line II–II.

The sealing bar 2 and 2', respectively, shown in FIG. 1a and 1b consists of a conventional insulating material, such as an asbestos cement strip, temperature-resistant and possibly somewhat flexible plastic plate, or a fiber fabric or laminated fabric or the like. The insulating material may also be mounted or cemented to a rigid backing member (not shown), such as a metal bar or plate. This plate or bar 2 is provided with spaced perforations 4 having a diameter of little more than the thickness of the resistance wire 6. A suitable resistance wire is a chrome nickel wire having a diameter of about 0.2 to 0.4 mm. This resistance wire may be supplied with electricity via a transformer or directly via an impulse sender.

The preparation of such a sealing bar encounters no difficulties and the wires can simply and quickly be drawn through the bar.

Figure 3:
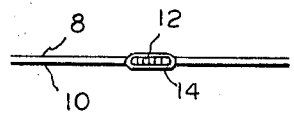
FIG. 3 is a cross section of a seal made with the device of the invention.

When sealing tubular banderoles, mostly straight sealing bars according to FIG. 1a are used; when sealing several superposed edges in overall wrapping, a round sealing bar according to FIG. 1b is preferred. When lowering the sealing bar onto two superposed films 8 and 10, holes or slots 12 are formed having craterlike edges 14 which are fused together, as shown in FIG. 3. The seal obtained by a plurality of such depressions (holes or slots) has an excellent strength so that the bursting pressure for bags closed this way is greater than the one of the film material per se.

Figure 4:
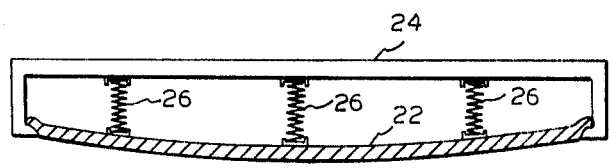
FIG. 4 is a longitudinal section of a device of the invention having a convex sealing bar.

In one embodiment, the sealing bar 22 shown in FIG. 4, is supported by a frame 24 and bowed outwardly to a convex shape by springs 26 which are propped against the frame. This device is especially suitable for sealing packages with soft or flexible contents.

While certain structures have been described for purposes of illustration, the invention is not to be so limited. Variation and modification with the scope of the disclosure and the claims can readily be effected by those skilled in the art.

I claim:

1. Apparatus for thermally sealing materials together in a discontinuous manner comprising, in combination, a thermally insulative member having a sealing surface, an underside and a plurality of spaced perforations therethrough; spring means, said insulative member being convex in shape and held in said convex shape by said spring means and an electrical resistance wire with a plurality of first parts passing between two adjacent perforations on the sealing surface of the insulative member and a plurality of second parts extending to the next perforation on the underside of the insulative member, said first parts engaging the materials to be sealed thereby to form depressions therein.